United States Patent
Shvodian (10) Patent No.: US 11,503,554 B2
(45) Date of Patent: Nov. 15, 2022

(54) DYNAMICALLY ACCOUNTING FOR PAST TRANSMIT POWER AS BASIS TO SET FUTURE TRANSMIT POWER ON CO-EXISTING AIR INTERFACE

(71) Applicant: Sprint Spectrum L.P., Overland Park, KS (US)

(72) Inventor: William Shvodian, McLean, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 77 days.

(21) Appl. No.: 16/947,228

(22) Filed: Jul. 23, 2020

(65) Prior Publication Data

US 2021/0360543 A1 Nov. 18, 2021

Related U.S. Application Data

(60) Provisional application No. 63/023,970, filed on May 13, 2020.

(51) Int. Cl.
| | |
|---|---|
| *H04W 52/00* | (2009.01) |
| *H04W 52/36* | (2009.01) |
| *H04L 5/14* | (2006.01) |
| *H04L 5/00* | (2006.01) |
| *H04W 92/10* | (2009.01) |

(52) U.S. Cl.
CPC ......... *H04W 52/367* (2013.01); *H04L 5/0082* (2013.01); *H04L 5/1469* (2013.01); *H04W 92/10* (2013.01)

(58) Field of Classification Search
None
See application file for complete search history.

(56) References Cited

U.S. PATENT DOCUMENTS

| | | |
|---|---|---|
| 8,483,618 B1 | 7/2013 | Vargantwar et al. |
| 10,440,665 B1 | 10/2019 | Witherell et al. |
| 10,652,890 B1 | 5/2020 | Oroskar et al. |
| (Continued) | | |

FOREIGN PATENT DOCUMENTS

WO WO2018/232245 12/2018

OTHER PUBLICATIONS

International Search Report and Written Opinion from International Application No. PCT/US2021/032278, dated Aug. 18, 2021.

*Primary Examiner* — Brandon M Renner (57) ABSTRACT

A method and system for controlling uplink transmit power of a UE when the UE is served concurrently on at least two air interfaces including a first air interface and a second air interface. An example method includes, iteratively for each successive given time interval of a continuum of equal-duration time intervals, (i) determining an actual average transmit power of the UE on the first air interface over the given time interval, (ii) using the determined actual average transmit power of the UE on the first air interface over the given time interval as a basis to set a maximum average transmit power of the UE for transmission on the second air interface in a respective subsequent time interval, and (iii) applying the set maximum average transmit power as a limitation on uplink transmit power of the UE for the transmission on the second air interface in the respective subsequent time interval.

14 Claims, 5 Drawing Sheets

(56) References Cited

U.S. PATENT DOCUMENTS

| | | | | |
|---|---|---|---|---|
| 2013/0051347 | A1* | 2/2013 | Zhang | H04W 52/228 |
| | | | | 370/329 |
| 2014/0302804 | A1 | 10/2014 | Hu et al. | |
| 2017/0347366 | A1* | 11/2017 | Ling | H04W 16/14 |
| 2018/0167897 | A1* | 6/2018 | Sampath | H04W 52/365 |
| 2018/0302210 | A1* | 10/2018 | Hedin | H04W 52/367 |
| 2019/0191392 | A1* | 6/2019 | Reial | H04W 52/16 |
| 2019/0215783 | A1* | 7/2019 | Chakraborty | H04W 52/34 |
| 2020/0305173 | A1* | 9/2020 | Papaleo | H04W 72/1289 |
| 2021/0029678 | A1* | 1/2021 | Liu | H04L 5/0048 |
| 2021/0136702 | A1* | 5/2021 | Wang | H04W 52/146 |

* cited by examiner

40 — WHEN A UE IS SERVED CONCURRENTLY ON AN FDD AIR INTERFACE AND A TDD AIR INTERFACE AND THE UE IS REQUIRED TO LIMIT ITS AGGREGATE UPLINK TRANSMIT POWER ACROSS THE FDD AIR INTERFACE AND TDD AIR INTERFACE TO NOT EXCEED A PREDEFINED LIMIT ON AVERAGE OVER A PREDEFINED TIME WINDOW, DIVIDE THE FDD AIR INTERFACE INTO A CONTINUUM OF EQUAL-DURATION TIME INTERVALS, WITH EACH TIME INTERVAL BEING NO LONGER THAN HALF OF A PREDEFINED TIME WINDOW

42 — FOR EACH SUCCESSIVE GIVEN TIME INTERVAL OF THE CONTINUUM OF TIME INTERVALS, (i) DETERMINE AN ACTUAL AVERAGE TRANSMIT POWER OF THE UE ON THE FDD AIR INTERFACE IN THE GIVEN TIME INTERVAL, (ii) USE THE DETERMINED ACTUAL AVERAGE TRANSMIT POWER OF THE UE ON THE FDD AIR INTERFACE IN THE GIVEN TIME INTERVAL AS A BASIS TO SET A MAXIMUM AVERAGE TRANSMIT POWER OF THE UE ON THE TDD AIR INTERFACE IN A RESPECTIVE SUBSEQUENT TIME INTERVAL OF THE CONTINUUM OF TIME INTERVALS, AND (iii) APPLY THE SET MAXIMUM AVERAGE TRANSMIT POWER AS A LIMITATION ON UPLINK TRANSMIT POWER OF THE UE ON THE TDD AIR INTERFACE IN THE RESPECTIVE SUBSEQUENT TIME INTERVAL

DYNAMICALLY ACCOUNTING FOR PAST TRANSMIT POWER AS BASIS TO SET FUTURE TRANSMIT POWER ON CO-EXISTING AIR INTERFACE

REFERENCE TO RELATED APPLICATION

This application claims priority to U.S. Provisional Patent Application No. 63/023,970, filed May 13, 2020, the entirety of which is hereby incorporated by reference.

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in RF spectrum) having a bandwidth and a center frequency and thus extending from a low-end frequency to a high-end frequency.

Each such carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, and n261, supporting FDD and TDD carriers, among numerous other possibilities.

Further, on the downlink and uplink channels, the coverage of each access node could define an air interface configured in a specific manner to define physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry synchronization signals that UEs could detect as an indication of the presence of coverage and to establish frame timing, other resource elements could be reserved to carry a reference signal that UEs could measure in order to determine coverage strength, and still other resource elements could be reserved to carry other control signaling such as PRB-scheduling directives and acknowledgement messaging from the access node to served UEs. And on the uplink, certain resource elements could be reserved to carry random access signaling from UEs to the access node, and other resource elements could be reserved to carry other control signaling such as PRB-scheduling requests and acknowledgement signaling from UEs to the access node.

OVERVIEW

When a UE enters into coverage of such a system, the UE could detect threshold strong coverage of an access node on a carrier (e.g., a threshold strong reference signal broadcast by the access node on that carrier) and could then engage in random-access and connection signaling with the access node to establish an air-interface connection, such as a Radio Resource Control (RRC) connection, through which the access node will then serve the UE on the carrier.

Further, if the UE is not already registered for service with the core network, the UE could transmit to the access node an attach request, which the access node could forward to a core-network controller for processing. And the core-network controller and access node could then coordinate setup for the UE of one or more user-plane bearers, each including an access-bearer portion that extends between the access node and a core-network gateway that provides connectivity with a transport network and a data-radio-bearer portion that extends over the air between the access node and the UE.

Once the UE is so connected and registered, the access node could then serve the UE in a connected mode over the air-interface connection, managing downlink air-interface communication of data to the UE and uplink air-interface communication of data from the UE.

For instance, when the core-network gateway receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in a control region of that subframe a Downlink Control Information (DCI) message that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI message that designates those upcoming PRBs. And the UE could then accordingly transmit the transport block to the access node in the designated PRBs.

Certain systems may also support carrier-aggregation service, where an access node serves a UE concurrently on multiple carriers, referred to as component carriers. To configure carrier aggregation service, once a UE has connected with an access node on a given carrier, referred to as the UE's primary component carrier (PCC), the access node could add to the UE's connection one or more secondary carriers, each referred to as a secondary component carrier (SCC). With carrier-aggregation configured, the access node could then coordinate air-interface communication with the UE on PRBs distributed across the UE's component carriers. Though certain systems may limit uplink scheduled communication to be on just the UE's PCC.

In a representative implementation, such a UE could be equipped with a variable-gain power amplifier and associated logic that enables the UE to transmit on the uplink with dynamically set transmit power. And as the access node serves the UE, the access node and UE could regularly engage in a power control process to control the UE's transmit power.

In an example of such a power control process, an uplink receiver at the access node could estimate a signal-to-interference-plus-noise-ratio (SINR) of transmission from the UE on a per subframe basis or the like and could compare that SINR with an SINR target (which might be dynamically set based on observed communication error rate). When the SINR is below the SINR target, the access node could then transmit to the UE a power-up transmit power control (TPC) command to which the UE would respond by incrementally increasing its transmit power. Whereas, when the SINR is above the SINR target, the access node could transmit to the UE a power-down TPC command to which the UE would respond by incrementally decreasing its transmit power.

In addition, industry standards, regulations, or other policy may restrict the UE's average transmit power to not exceed a defined specific absorption rate (SAR). In a representative implementation, the SAR limit might be 1.6 watts per kilogram (1.6 W/kg) average over a 6-minute window. This can usually be met by a UE transmitting 23 decibel-milliwatts (dBm) (200 milliwatts) continuously or on average over a 6-minute window. But other examples could apply as well.

The practical impact of this average transmit power limit on operation of the UE could relate to both the UE's actual transmit power and the UE's duty cycle, i.e., how often the UE's uplink transmission is active. For instance, if the UE transmits continuously in each subframe for at least the SAR time window (e.g., 6 minutes), then the UE's actual instantaneous transmit power in each subframe for that period of time should be restricted to not exceed the SAR limit (e.g., 23 dBm). Whereas, if the UE alternates equal amounts of time (e.g., on a subframe basis) between transmitting and not transmitting for a duration of at least the SAR time window, then the UE's actual instantaneous transmit power each time the UE transmits could in theory be up to twice the SAR limit (e.g., 23 dBm×2=26 dBm), since the UE's average transmit power for that duration would be half of its actual transmit power.

When the industry advances from one generation of wireless technology to the next, or in other scenarios, networks and UEs may also support dual connectivity (or non-standalone) service. Dual-connectivity service could involve a UE having at least two separate and co-existing air-interface connections, such as a primary connection with a first access node typically referred to as a master node (MN) and a secondary connection with a second access node typically referred to as a secondary node (SN), and possibly with a different RAT per connection.

In an example dual-connectivity arrangement referred to as FDD-TDD dual connectivity, the UE's primary connection could be on one or more FDD carriers, and the UE's secondary connection could be on one or more TDD carriers. But other examples are possible as well.

With dual connectivity, each access node could serve the UE respectively in the manner discussed above, so the UE could engage in uplink transmission concurrently on its primary and secondary connections. Further, for each of the UE's connections, the UE could apply a respective variable gain for its transmit power and could engage in a respective power control process with the serving access node. But here, the SAR limit could restrict the UE's average aggregate transmit power across the primary and secondary connections, i.e., requiring the average of the UE's total transmit power on those co-existing connections to not exceed the SAR limit (e.g., 23 dBm). And here the UE could apply a dynamic power sharing process to distribute its limited uplink transmit power across its connections.

In an example dynamic power sharing process for FDD-TDD dual connectivity, the UE could apply the SAR limit to its primary FDD connection and, on a per subframe basis, could treat any remaining transmit power within that limit as the UE's maximum transmit power on its secondary TDD connection. More particularly, on a per subframe basis, the UE and MN could engage in a power control process as described above to establish the UE's transmit power on the FDD connection, capped by the 23 dBm limit. And for each subframe, if the secondary TDD connection is uplink in that subframe, the UE could then treat any difference between the 23 dBm limit and the UE's actual FDD transmit power in that subframe as being the UE's average transmit power on its secondary TDD connection with the SN. Further, the UE and SN could likewise engage in a power control process as described above, to establish the UE's transmit power for that same subframe on the TDD connection, capped by the dynamically established maximum transmit power.

At least when a UE is in relatively poor RF coverage, it may be desirable for the UE to operate with as high uplink transmit power as permissible, because higher uplink transmit power could help improve the overall quality and speed of the UE's uplink communication.

Unfortunately, however, with dynamic power sharing as noted above for FDD-TDD dual connectivity, the UE's aggregate instantaneous transmit power across its FDD and TDD air interfaces would be capped by the 23 dBm to meet the SAR emission limit.

One way to overcome this technical problem is to impose an uplink duty cycle on the FDD uplink at the power level where the SAR limit is not exceeded, and to set the TDD maximum uplink transmit power and/or duty cycle such that the UE's average total transmit power on FDD and TDD would be within the SAR limit. For example, if the transmit power to not exceed the SAR limit is 23 dBm and if the UE operates on the FDD connection with a 50% uplink duty cycle and a maximum of 23 dBm (i.e., 20 dBm on average over time), then (depending on the TDD configuration), the UE could also operate on the TDD connection with a 50% uplink duty cycle and maximum of 23 dBm (i.e., also 20 dBm on average over time), or with a 25% uplink duty cycle and a maximum of 26 dBm (also 20 dBm on average over time). With this arrangement, the UE's instantaneous total transmit power on FDD and TDD could at times exceed 23 dBm limit. But the UE's average aggregate transmit power over time would be safely within the SAR limit. Unfortunately, however, imposing an uplink duty cycle on the FDD uplink is complicated and could increase the FDD uplink latency.

Another way to overcome the technical problem in this scenario is apply a stricter limit on uplink transmit power on the FDD connection but with no FDD uplink duty cycle, and to set the TDD maximum transmit power and/or duty cycle such that the average total transmit power on FDD and TDD would be within the SAR limit. For example, if the UE imposes a full time maximum 20 dBm on the FDD connection, then the UE could operate on the TDD connection with a 50% uplink duty cycle and maximum of 23 dBm, or with a 25% uplink duty cycle and a maximum of 26 dBm. Here again, the UE's instantaneous total transmit power on FDD and TDD could at times exceed the 23 dBm SAR limit, but the UE's average aggregate transmit power over time would again likewise be safely within the SAR limit. Unfortunately, however, imposing a power limit on FDD could result in cell-edge coverage problems for the FDD uplink and could therefore result in coverage holes.

Disclosed herein is an improved technique to help overcome this problem. In accordance with the disclosure, when a UE operates concurrently on FDD and TDD air interfaces, the UE could divide its FDD and TDD air interfaces respectively into a continuum of equal length time intervals substantially shorter than the SAR time window, and the UE could use its actual transmit power per time interval on the FDD air interface as a basis to control its maximum transmit power in a respective subsequent time interval on the TDD air interface, such that the UE's average aggregate transmit power over at least those time intervals would be within the SAR limit.

By way of example, the UE could divide the FDD and TDD air interfaces respectively into a continuum of equal length time intervals that are no longer than half of the SAR time window (e.g., optimally on the order of just milliseconds compared with the SAR window on the order of minutes). Iteratively for each successive such time interval on the FDD air interface, the UE could determine the UE's actual average FDD transmit power (accounting for any variation in the UE's actual transmit power throughout the given time interval), and the UE could compute a difference between the SAR limit and that computed actual average FDD transmit power. And the UE could then apply that computed difference as the UE's maximum average transmit power in a respective subsequent time interval on the TDD air interface.

For instance, if the SAR limit is 23 dBm and if the UE operates on its FDD air interface with 20 dBm on average over a given time interval, then the UE could set its maximum average transmit power for transmission on its TDD air interface in a respective subsequent time interval to be 23 dBm−20 dBm=20 dBm. Applying this maximum average, the UE might then operate in that respective subsequent time interval on the TDD air interface with a 50% uplink duty cycle and maximum of 23 dBm, which would be a maximum average of 20 dBm over time through the time interval. Or the UE might operate in that respective subsequent time interval on the TDD air interface with a 25% uplink duty cycle and maximum of 26 dBm, which would likewise be a maximum average of 20 dBm over time through the time interval.

In an example implementation of this process, the time intervals on the FDD air interface would be the same duration as the time intervals on the TDD air interface and may, but need not, be exactly aligned in time with each other.

Further, for each given time interval on the FDD air interface as to which the UE determines its actual average transmit power as a basis to set the UE's maximum average transmit power in a respective subsequent time interval on the TDD air interface, the respective subsequent time interval on the TDD air interface could be a fixed duration ahead in time. For instance, if the continuum of time intervals on the FDD air interface are aligned with the time intervals on the TDD air interface, then for each given time interval on the FDD air interface, the subsequent time interval on the TDD air interface could be the time interval that immediately follows the given time interval, or could be the time interval that is M intervals ahead, where N is at least two. Other examples are possible as well including offsets that are not integer multiples of the time interval.

Optimally, this process could thus allow for possibly increased transmit power on the TDD air interface, while keeping the UE's average aggregate transmit power across its FDD and TDD air interfaces within the SAR limit over the SAR time window.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of 4G LTE, 5G NR, and 4G-5G dual connectivity, referred to as E-UTRA-NR Dual Connectivity (EN-DC).

With EN-DC, a 4G LTE access node (4G evolved Node-B (eNB)) functions as the MN, and a 5G NR access node (5G next-generation Node-B (gNB)) functions the SN. Thus, a UE could first establish a standalone 4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE.

Figure 1:
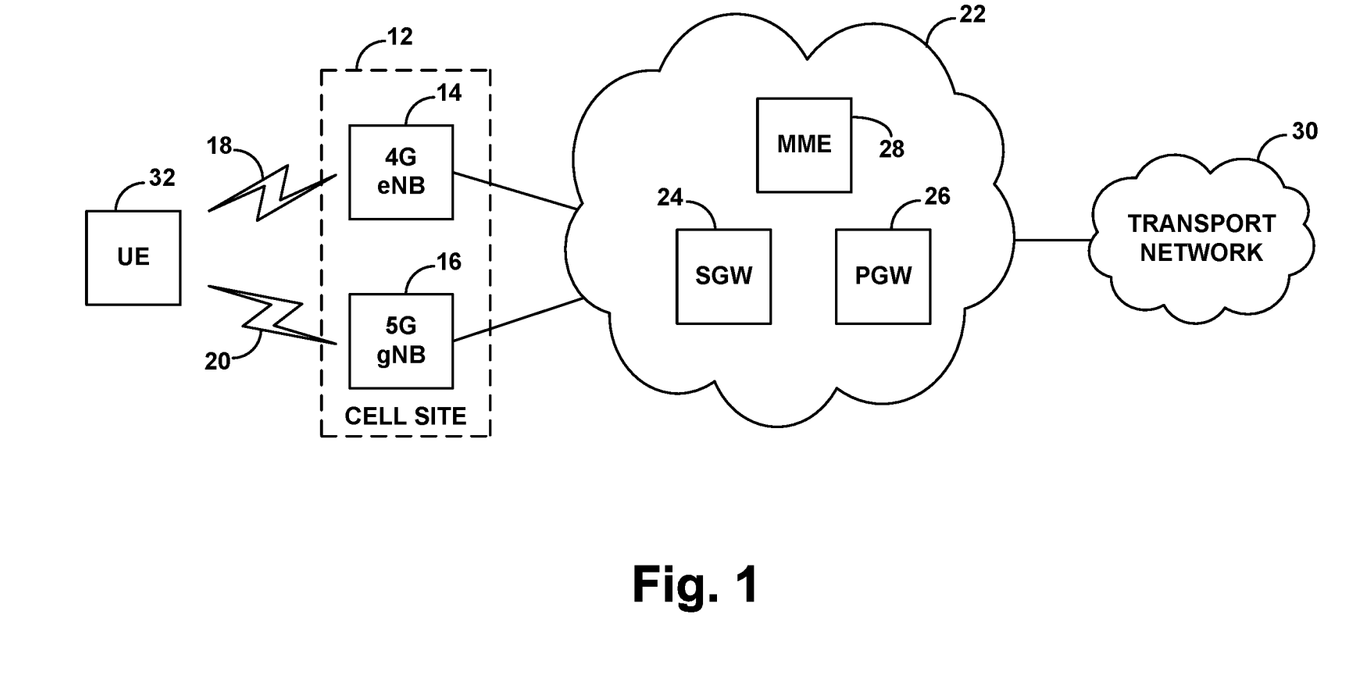
FIG. 1 is a simplified block diagram of an example network arrangement in which features of the present disclosure can be implemented.

It should be understood, however, that the principles disclosed herein could extend to apply with respect to other scenarios as well, such as with respect to other RATs and other dual-connectivity or uplink carrier aggregation configurations. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations FIG. 1 is a simplified block diagram of an example network arrangement having a cell site 12 that includes a 4G eNB 14 and a 5G eNB 16. These access nodes could be macro access nodes of the type configured to provide a wide range of coverage or could take other forms, such as small cell access nodes, relays, femtocell access nodes, or the like, possibly configured to provide a smaller range of coverage.

Each access node could have a respective antenna structure, perhaps an antenna array, that is configured to transmit and receive electromagnetic signals in a region defined by an antenna pattern or radiation pattern, or the access nodes could share portions of a common antenna structure for this purpose. Further, each access node could be configured to provide coverage on at least one respective carrier according to a respective RAT, with each carrier being FDD or TDD as noted above. In a representative example, for instance, the 4G eNB 14 could provide 4G coverage 18 on one or more FDD carriers, and the 5G eNB 16 could provide 5G coverage 20 on one or more TDD carriers.

On the downlink and uplink, the air interface on each such carrier could be structured as described above by way of example, being divided over time into frames, subframes, and symbol time segments, and over frequency into subcarriers, thus defining an array of air-interface resource elements grouped into PRBs allocable by the access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having different subcarrier spacing and/or symbol time segment length than the other, and/or with one making different use of MIMO technologies than the other, among other possibilities.

In the example arrangement of FIG. 1, the 4G eNB 14 and 5G gNB 16 are both interfaced with a core network 22, such as an Evolved Packet Core (EPC) network or Next Generation Core (NGC) network. In the example shown, the core network 22 includes a serving gateway (SGW) 24, a packet data network gateway (PGW) 26, and a mobility management entity (MME) 28, although other arrangements are possible as well.

In an example implementation, without limitation, each access node could have an interface with the SGW 24, the SGW 24 could have an interface with the PGW 26, and the PGW 26 could provide connectivity with a transport network 30. Further, each access node could have an interface with the MME 28, and the MME 28 could have an interface with the SGW 24, so that the MME 28 could coordinate setup of bearers for UEs to enable the UEs to engage in packet-data communication via 4G and 5G. Alternatively, just the 4G eNB 14 might have an interface with the MME 28 and may function as an anchor for signaling with the MME 28 both for 4G service and for 5G and EN-DC service.

FIG. 1 also illustrates an example UE 32 in coverage of both the 4G eNB 14 and the 5G gNB 16. This UE could be equipped with a 4G LTE radio and/or a 5G NR radio, and could include associated circuitry and logic that enables the UE to engage in 4G LTE service, 5G NR service, and EN-DC service.

In line with the discussion above, upon entering into coverage of cell site 12, the UE could scan for and discover coverage of the 4G eNB 14 and could responsively engage in random access and connection signaling with the 4G eNB 14 to establish a 4G connection on a 4G FDD carrier. Further, the UE could engage in attach signaling with the MME 28, via the 4G eNB 14, and the MME 28 could coordinate setup for the UE of at least one user-plane bearer, including an access-bearer portion extending between the 4G eNB 14 and the PGW 26 and a data-radio-bearer portion extending over the air between the 4G eNB 14 and the UE. And the 4G eNB 14 might also add one or more additional FDD carriers to the UE's connection to provide the UE with uplink FDD carrier aggregation.

In relation to this connection and/or attachment process, the 4G eNB 14 could also transmit to the UE an RRC message carrying a UE-capability enquiry, and the UE could respond to the 4G eNB 14 with a "UE capability information" information element (IE), which could indicate that the UE is EN-DC capable. Alternatively, the 4G eNB 14 could discover in another manner that the UE is EN-DC capable.

Operating as MN, the 4G eNB 14 could then work to configure EN-DC service for the UE. For instance, the 4G eNB 14 could first engage in process to add the 5G gNB 16 as an SN for the UE, such as by transmitting to the 5G gNB 16 an SN-Addition request to cause the 5G gNB to allocate resources for a 5G connection for the UE on one or more 5G TDD carriers, receiving an SN-Addition-Request acknowledge message from the 5G gNB 16, and engaging in associated RRC signaling with the UE, in response to which the UE could then access and complete establishment of the 5G connection. Further, the 4G eNB 14 could engage in signaling to transfer to the UE's access bearer to the 5G gNB 16 as well and to coordinate setup for the UE of a split bearer to enable the UE's data communication to be split between the 4G eNB 14 and 5G gNB 16.

The 4G eNB 14 and 5G gNB 16 could then provide the UE with EN-DC service, concurrently serving the UE over their respective connections with the UE. Namely, the 4G eNB 14 could serve the UE on an FDD air interface that encompasses one or more 4G FDD carriers, allocating PRBs of that FDD air interface as needed to carry data between the UE and the 4G eNB 14 and the UE, and the 5G gNB 16 could serve the UE on a TDD air interface encompassing one or more 5G TDD carriers, allocating PRBs of that TDD air interface as needed to carry data between the UE and the 5G gNB 16.

To facilitate power control as noted above, the UE could include a variable-gain power amplifier respectively for each of the UE's connections, and the UE could engage in a power control process on a subframe basis or other basis respectively for each connection. Thus, each time the 4G eNB 14 receives a data transmission from the UE, the 4G eNB 14 could evaluate the receive SINR of that transmission and, based on a set-point comparison, could then transmit to the UE (e.g., in a DCI message) a power-down or power-up TPC command to adjust the UE's transmit power on the UE's 4G connection. And likewise, each time the 5G gNB 16 receives a data transmission from the UE, the 5G eNB 16 could evaluate the receive SINR of that transmission and, based on a set-point comparison, could then transmit to the UE (e.g., in a DCI message) a power-down or power-up TPC command to adjust the UE's transmit power on the UE's 5G connection.

As indicated above, the UE's ability to increment its transmit power could be limited by standards or regulations to not exceed a particular SAR limit on average over a defined SAR time window. And with the UE's concurrent operation on FDD and TDD air interfaces, this limit could apply as to the UE's aggregate transmit power across the air interfaces. Without limitation, as noted above for instance, the SAR limit could be 23 dBm and the SAR time window could be 6 minutes.

As further noted above, to help maximize the UE's transmit power on the TDD air interface, while keeping the UE's average aggregate transmit power within the SAR limit, the present disclosure provides for the UE dividing its FDD and TDD air interfaces respectively into a continuum of equal length time intervals that are much shorter than the SAR time window, and the UE using its actual average transmit power in each successive time interval on the FDD air interface as a basis to set its maximum average transmit power in a respective subsequent time interval on the TDD air interface, such that the UE's average aggregate transmit power across the air interfaces over at least those time intervals would be within the SAR limit.

Further, the disclosure provides for the UE repeating this process iteratively over time with the same spacing between each time interval on the FDD air interface and its respective subsequent time interval on the TDD air interface, so that the UE's average transmit power over time continues to be within the SAR limit. As noted above, for instance, if the time intervals on the FDD air interface are aligned with the time intervals on the TDD air interface, the UE could use its actual average transmit power in each time interval, N, on the FDD air interface as a basis to set its maximum average transmit power respectively in the immediately following time interval, N+1, on the TDD air interface. Or in that scenario as well, the UE could use its actual average transmit power in each time interval, N, on the FDD air interface as a basis to set its maximum average transmit power respectively in the second time interval later, N+2, on the TDD air interface. Other examples are possible as well.

The time intervals into which the UE divides its FDD air interface and its TDD air interface could be smaller than $1/10^{th}$ of the SAR time window and perhaps less than $1/100^{th}$ of the SAR time window, with shorter intervals allowing for better averaging. Thus, the time intervals could be on the order of milliseconds, with the SAR time window being on the order of minutes. For instance, the time intervals could be 5 milliseconds or 10 milliseconds long. Further, as noted above, the time intervals on the FDD air interface could optimally be the same duration as the time intervals on the TDD air interface.

In addition, the durations of these time intervals could be set based TDD duty cycle or configuration of the TDD air interface, such as the downlink-to-uplink switching periodicity of the TDD air interface. Considering the 4G LTE TDD configurations as shown in Table 1, for instance, if the 5G TDD configuration is aligned with an example such TDD configuration (perhaps to allow coexistence with an adjacent LTE network), then the UE could define the time intervals to be 5 milliseconds if TDD configuration is configuration 0, 1, 2, or 6, or the UE could define the time intervals to be 10 milliseconds long if the TDD configuration is configuration 3, 4, or 5. Other arrangements are possible as well.

TABLE 1

| TDD Configuration | Switching Periodicity (ms) | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 | D | S | U | U | U | D | S | U | U | U |
| 1 | 5 | D | S | U | U | D | D | S | U | U | D |
| 2 | 5 | D | S | U | D | D | D | S | U | D | D |
| 3 | 10 | D | S | U | U | U | D | D | D | D | D |
| 4 | 10 | D | S | U | U | D | D | D | D | D | D |
| 5 | 10 | D | S | U | D | D | D | D | D | D | D |
| 6 | 5 | D | S | U | U | U | D | S | U | U | D |

Iteratively for each successive given time interval on the FDD air interface, the UE could (i) determine its actual average transmit power, $P_{avg}$, on the FDD air interface over the duration of the time interval, accounting for any variations based on the power control process for instance and (ii) compute the linear difference between the SAR limit and that computed actual average transmit power $P_{avg}$, and (iii) set that computed difference as the UE's maximum average transmit power for the respective subsequent time interval on the TDD air interface.

As noted above, for instance, if the SAR limit is 23 dBm and if the UE operates on its FDD air interface with 20 dBm on average over a given time interval, then the UE could set its maximum average transmit power for transmission on its TDD air interface in a respective subsequent time interval to be 23 dBm-20 dBm=20 dBm.

To apply the computed maximum average transmit power in the respective subsequent time interval on the TDD air interface, the UE could work to ensure that its average transmit power over the course of the subsequent time interval on the TDD air interface does not exceed the computed maximum. One way to accomplish this is for the UE to set the computed maximum average transmit power as its maximum or peak transmit power in the subsequent time interval on the TDD air interface, thus avoiding transmission at higher than that power level throughout the duration of the subsequent time interval on the TDD air interface. Another way to accomplish this is for the UE to monitor its average transmit power over time during the subsequent time interval on the TDD air interface and to dynamically adjust its transmit power on the TDD air interface throughout the subsequent time interval so as to keep the average transmit power within the computed maximum.

Further, how this plays out in practice for a particular subsequent time interval on the TDD air interface could relate to the UE's uplink duty cycle in that subsequent time interval on the TDD air interface.

For instance, if the UE sets its maximum average transmit power in the subsequent time interval on the TDD air interface to be 20 dBm, and if UE's uplink duty cycle in that subsequent time interval on the TDD air interface is 50%, then the UE could cap its transmit power on the TDD air interface throughout that subsequent time interval to not exceed 23 dBm, which would keep the UE's average transmit power on the TDD air interface in that subsequent time interval to within the 20 dBm limit.

Or if the UE sets its maximum average transmit power in the subsequent time interval on the TDD air interface to be 20 dBm, and if UE's uplink duty cycle in that subsequent time interval on the TDD air interface is 25%, then the UE could cap its transmit power on the TDD air interface throughout that subsequent time interval to not exceed 26 dBm, which would likewise keep the UE's average transmit power on the TDD air interface in that subsequent time interval to within the 20 dBm limit.

Figure 2:
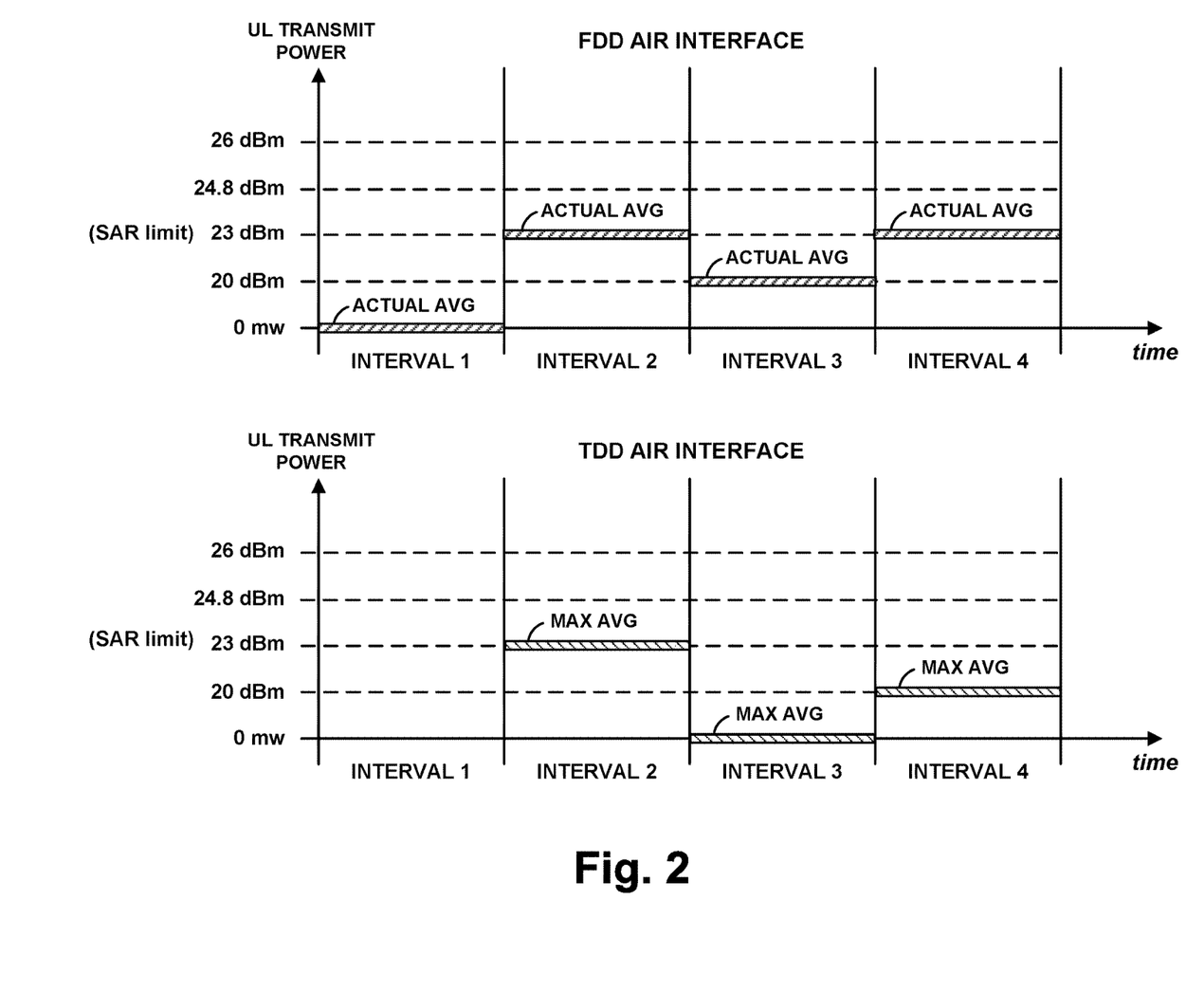
FIG. 2 is a diagram depicting example time intervals and transmit power levels in an example implementation.

FIG. 2 is a diagram illustrating how this process can play by way of example out over a representative sequence of four time intervals, with the UE's actual average transmit power in each successive time interval on the FDD air interface being used to control the UE's maximum average transmit power in the immediately following time interval on the TDD air interface.

The figure shows example time-aligned graphs of UE transmit power respectively for the UE's FDD and TDD air interfaces, each with time along the x axis and transmit power in linear (rather than logarithmic) intervals along they axis. In particular, the figure depicts example time intervals 1, 2, 3, and 4. And for each air interface, the figure depicts example transmit power levels of approximately 0 (zero) milliwatts, 100 milliwatts (20 dBm), 200 milliwatts (23 dBm), 300 milliwatts (24.8 dBm), and 400 milliwatts (26 dBm).

As to the FDD air interface, the figure shows an example SAR limit of 23 dBm. And for each of representative time intervals 1, 2, and 3 on the FDD air interface, the figure shows (i) the UE's actual average transmit power in that time interval on the FDD air interface and (ii) the UE's set maximum transmit power in the immediately following time interval on the TDD air interface. And for representative interval 4 on the FDD air interface, the figure shows the UE's actual average transmit power in that time interval on the FDD air interface.

With the example illustrated, in Interval 1, the UE's actual average transmit power on the FDD air interface is zero (e.g., zero milliwatts). As the linear difference between the SAR limit of 23 dBm and this actual average transmit power is therefore 23 dBm, the UE then sets its maximum average transmit power for Interval 2 on the TDD air interface to be 23 dBm, which the UE could apply as noted above. That way, the total of the UE's average transmit power in Interval 1 on the FDD air interface and the UE's average transmit power in Interval 2 on the TDD air interface would be within the SAR limit.

In Interval 2, the UE's actual average transmit power on the FDD air interface is 23 dBm. As the linear difference between the SAR limit of 23 dBm and this actual average transmit power is therefore zero (e.g., zero milliwatts), the UE sets its maximum average transmit power for Interval 3 on the TDD air interface to be zero, and thus the UE may forgo transmission on the TDD air interface in Interval 3. That way, the total of the UE's aggregate transmit power in Interval 2 on the FDD air interface and the UE's average transmit power in Interval 3 on the TDD air interface would likewise be within the SAR limit.

And in Interval 3, the UE's actual transmit power on the FDD air interface is 20 dBm. And as the linear difference between the SAR limit of 23 dBm and this actual average transmit power is therefore 20 dBm, the UE sets its maximum average transmit power for Interval 4 on the TDD air interface to be 20 dBm, which the UE could again apply as noted above. That way, the total of the UE's average transmit power in Interval 3 on the FDD air interface and the UE's average transmit power in Interval 4 on the TDD air interface would similarly be within the SAR limit.

Further, in Interval 4, the UE's actual transmit power on the FDD air interface is 23 dBm. Therefore, as with Interval 2 on the FDD air interface, the UE sets its maximum average transmit power for Interval 5 (not shown) on the TDD air interface to be zero and may thus forgo transmission on the TDD air interface in Interval 5.

This process would then continue iteratively for each successive time interval.

Optimally through this process, as illustrated by this example, the UE's aggregate average transmit power across its FDD and TDD air interfaces could at times be higher than the SAR limit, which may help to improve the quality and speed of the UE's transmission and may help provide improved user experience. For instance, with the example of FIG. 2, the UE's aggregate average transmit power in Interval 2 across its FDD and TDD air interfaces could optimally be up to 26 dBm (i.e., the sum of 23 dBm on the FDD air interface and 23 dBm on the TDD air interface), which is higher than the SAR limit. And the UE's aggregate average transmit power in Interval 4 across its FDD and TDD air interfaces could optimally be up to 24.8 dBm (i.e., the sum of 23 dBm on the FDD air interface and 20 dBm on the TDD air interface), which is also higher than the SAR limit.

But, as the present process helps to ensure that the UE's average aggregate transmit power over the time-shifted intervals on the FDD air interface and the TDD air interface (e.g. each Interval N on the FDD air interface and respective Interval N+1 on the TDD air interface) is within the SAR limit, the UE's average aggregate transmit power over the substantially longer SAR time window should be safely within the SAR limit.

Note also that, while the above description focuses on application of this process as to a scenario where the UE is served with dual-connectivity on an FDD connection and a TDD connection, the described principles could apply as well in other scenarios.

For instance, the principles could apply as well with respect to a scenario where the UE is served with uplink FDD-TDD carrier aggregation, e.g., where an access node serves the UE on a connection encompassing both one or more FDD carriers and one or more TDD carriers, and where the UE applies dynamic power distribution and sharing between FDD and TDD. Further, the principles could apply as well with respect to a scenario where the UE is served with dual connectivity on multiple FDD connections, where the UE is served with dual connectivity on multiple TDD connections, where the UE is served with carrier aggregation on multiple FDD carriers, where the UE is served with carrier aggregation on multiple TDD carriers, and/or where the UE is served with dual connectivity or carrier aggregation on at least two separate bands, among other possibilities In any of these or other example scenarios, the UE could likewise divide each of its multiple air interfaces into a continuum of time intervals, and for each successive time interval on one of the air interfaces, the UE could use its actual average transmit power on that air interface in that time interval as a basis to control the UE's maximum average transmit power in a respective subsequent time interval on another air interface. The process could thus play out largely in the same manner as described above.

And note that there may additionally be a limitation on the UE's total instantaneous transmit power across the UE's multiple air interface. This additional limit might further restrict how strong the UE's transmission can be on the second air interface at any moment in time based on the UE's transmit power on the first air interface at that same moment in time.

Figure 3:
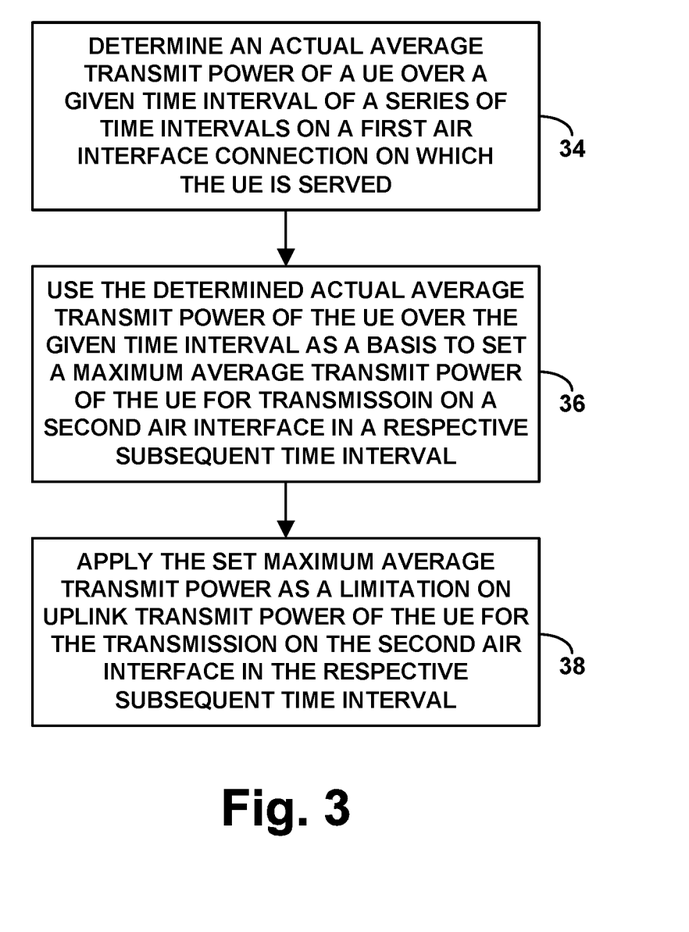
FIG. 3 is a flow chart depicting an example method in accordance with the disclosure.

FIG. 3 is a flow chart depicting a method that could be carried out in accordance with the present disclosure, to control uplink transmit power of a UE when the UE is served concurrently on at least two air interfaces including a first air interface and a second air interface, the UE having variable transmit power per air interface. In particular, the method includes iteratively carrying out a set of operations for each given time interval of a series of time intervals. As shown in FIG. 3, at block 34, the operations include the UE determining an actual average transmit power of the UE on the first air interface over the given time interval. At block 36, the operations further include the UE using the determined actual average transmit power of the UE on the first air interface over the given time interval as a basis to set a maximum average transmit power of the UE for transmission on the second air interface in a respective subsequent time interval. And at block 38, the operations include the UE applying the set maximum average transmit power as a limitation on uplink transmit power of the UE for the transmission on the second air interface in the respective subsequent time interval.

In practice, the act of the UE determining its actual average transmit power on the first air interface in the given time interval could involve the UE maintaining a rolling average of its actual transmit power across the given time interval. For instance, if the time interval spans five uplink subframes and if the UE's transmit power could vary on a per-subframe basis (e.g., through a power control process as noted above), the UE could update the rolling average at each subframe, so as to compute an overall average of the UE's actual transmit power throughout the given time interval. Further, in this example process, for any subframe where the UE was not actively transmitting on the uplink, the UE could deem its transmit power to be zero.

Note also that the uplink transmit power at issue here could be transmit power for transmission by the UE on an uplink traffic channel, such as a physical uplink shared channel (PUSCH), and/or perhaps for control channel transmission by the UE on an uplink control channel, such as a physical uplink control channel (PUCCH), among other possibilities.

In line with the discussion above, the first air interface could be an FDD air interface (e.g., encompassing one or more FDD carriers) and the second air interface could be a TDD air interface (e.g., encompassing one or more TDD carriers).

Further, as discussed above, for each given time interval of the series of time intervals, the respective subsequent time interval could be spaced by the same duration as for each other given time interval. For instance, for each given time interval, the respective subsequent time interval could be the time interval immediately following the given time interval. Or for each given time interval, the respective subsequent time interval could be the time interval that is at least a fixed number, M, of time intervals after the given time interval, where M is at least two. Also, the TDD interval does not need to be an integer number of time intervals delayed from the FDD interval.

In addition, as discussed above, the method could include the UE dividing the first air interface into a first continuum of equal-duration time intervals, and the UE dividing the second air interface into a second continuum of equal-duration time intervals, with the time intervals of the first continuum being the same duration as the time intervals of the second continuum. And in that case, each given time interval could be a time interval of the first continuum, and, for each given time interval, the respective subsequent time interval could be a time interval of the second continuum.

Further, the time intervals of the first continuum could be aligned with the time intervals of the second continuum. For instance, the UE could generally divide time into a single continuum of equal-duration time intervals, with that continuum applying on both the first air interface and the second air interface.

Still further, as discussed above, the UE could be required to limit its aggregate uplink transmit power to not exceed a predefined limit (e.g., SAR limit) on average over a predefined time window (e.g., SAR time window), and the time intervals of the series of time intervals could be substantially shorter than the predefined time window. For instance, as noted above, the predefined limit could be 23 decibel-milliwatts (dBm), the predefined time window could be 6 minutes, and each time interval could be no longer than half of the predefined time window.

Yet further, as discussed above, the act of using the determined actual average transmit power of the UE on the first air interface over the given time interval as a basis to set the maximum average transmit power of the UE for transmission on the second air interface in the respective subsequent time interval could involve (a) the UE computing a difference between the predefined limit and the determined actual average transmit power of the UE on the first air interface in the given time interval and (b) the UE setting, as the maximum average transmit power of the UE for transmission on the second air interface in the respective subsequent time interval, the computed difference.

And still further, as discussed above, the act of applying the set maximum average transmit power as a limitation on uplink transmit power of the UE for the transmission on the second air interface in the respective subsequent time interval could involve the UE limiting its actual average transmit power on the second air interface in the respective subsequent time interval to be no higher than the maximum average transmit power.

Yet further, as discussed above, in addition to setting the average power on the TDD interface, there could be a maximum instantaneous combined FDD+TDD power that cannot be exceeded.

Figure 4:
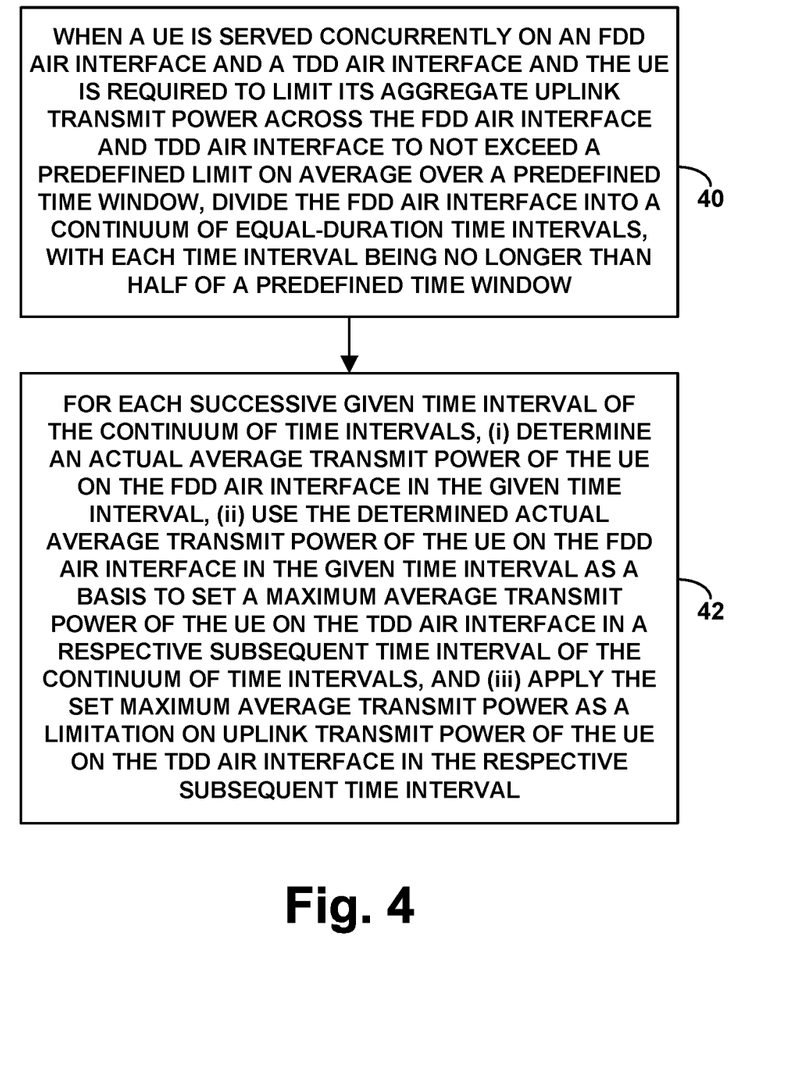
FIG. 4 is another flow chart depicting an example method in accordance with the disclosure.

FIG. 4 is next a flow chart of a method that could be carried out in accordance with the present disclosure, to control uplink transmit power of a UE when the UE is served concurrently on an FDD air interface and a TDD air interface, in a scenario where the UE is required to limit its aggregate uplink transmit power across the FDD air interface and TDD air interface to not exceed a predefined limit on average over a predefined time window.

As shown in FIG. 4, at block 40, the method includes the UE dividing the FDD air interface and TDD air interface respectively into a continuum of equal-duration time intervals, with each time interval being no longer than half of the predefined time window. And at block 42, the method includes, for each successive given time interval of the continuum of time intervals, (i) the UE determining an actual average transmit power of the UE on the FDD air interface in the given time interval, (ii) the UE using the determined actual average transmit power of the UE on the FDD air interface in the given time interval as a basis to set a maximum average transmit power of the UE on the TDD air interface in a respective subsequent time interval of the continuum of time intervals, and (iii) the UE applying the set maximum average transmit power as a limitation on uplink transmit power of the UE on the TDD air interface in the respective subsequent time interval.

Various features discussed above can be carried out in this context as well, and vice versa.

For example, the act of using the determined actual average transmit power of the UE on the FDD air interface in the given time interval as a basis to set the maximum average transmit power of the UE on the TDD air interface in the respective subsequent time interval could involve (a) the UE computing a difference between the predefined limit and the determined actual average transmit power of the UE on the FDD air interface in the given time interval and (b) the UE setting, as the maximum average transmit power of the UE for transmission on the TDD air interface in the respective subsequent time interval, the computed difference. And further, each time interval could be no longer than half of the predefined time window.

Figure 5:
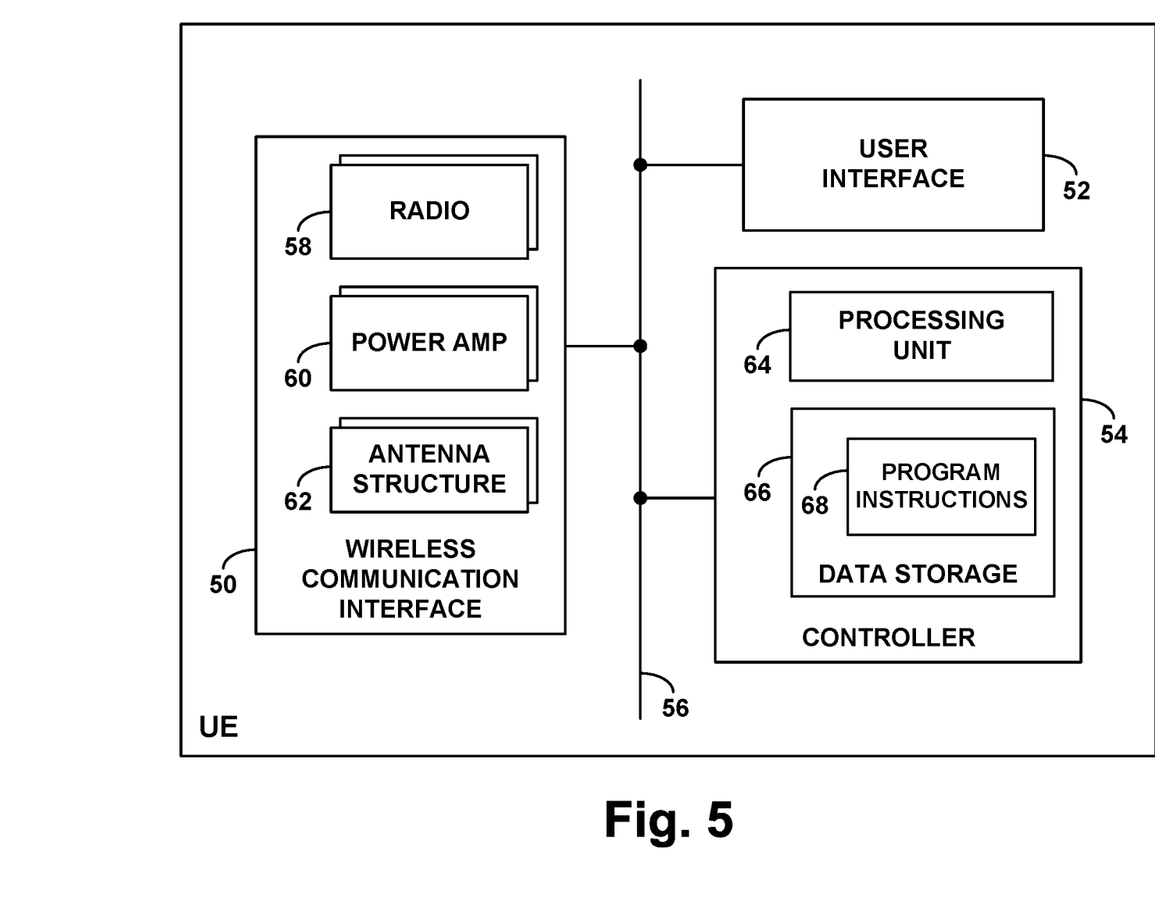
FIG. 5 is a simplified block diagram of an example UE operable in accordance with the disclosure.

Finally, FIG. 5 is a simplified block diagram of an example UE, showing some of the components that could be included to facilitate carrying out operations as described herein. As shown in FIG. 5, the example UE includes a wireless communication interface 50, a user interface 52, and a controller 54. These components could be interconnected, integrated, and/or communicatively linked together in various ways now known or later developed, such as by a system bus or other connection mechanism 56 for instance.

The wireless communication interface 50 could operate to support and thus facilitate air interface communication concurrently on a first air interface and a second air interface, and the wireless communication interface could operate to support and thus facilitate variable transmit power of the UE respectively on each air interface. As shown, for instance, the wireless communication interface could include multiple radios 58, multiple variable-gain power amplifiers 60 governing uplink transmit power of the UE on the air interfaces, and one or more antenna structures 62.

The user interface 52, which could be included if the UE is user operated, could include input and output components (not shown) to facilitate interaction with a user. For instance, the user interface could include analog-to-digital conversion circuitry and could include input components such as a touch screen, microphone, and keypad, and output components such as a display screen and sound speaker.

And the controller 54, which could be integrated with wireless communication interface 50 (e.g., on a common chipset) or provided in another manner could operate to carry out or cause the UE to carry out various operations described herein. As shown, controller 54 could include a at least one processing unit 64 (e.g., one or more general purpose processors such as microprocessors and/or one or more special purpose processors such as application specific integrated circuits), and non-transitory data storage 66 (e.g., one or more volatile and/or non-volatile storage components, such as magnetic, optical and/or flash storage). And non-transitory data storage 66 could hold program instructions 68, which could be executable by the processing unit 66 to carry out the various described operations. Alternatively, the controller could take other forms.

Various features discussed above can be carried out in this context as well, and vice versa. The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for controlling uplink transmit power of a user equipment device (UE) when the UE is served concurrently on at least two air interfaces including a first air interface and a second air interface, wherein the UE has variable transmit power per air interface, the method comprising:
   iteratively for each given time interval of a series of time intervals:
   (i) determining by the UE an actual average transmit power of the UE on the first air interface over the given time interval,
   (ii) using by the UE the determined actual average transmit power of the UE on the first air interface over the given time interval as a basis to set a maximum average transmit power of the UE for transmission on the second air interface in a respective subsequent time interval, wherein using by the UE the determined actual average transmit power of the UE on the first air interface over the given time interval as the basis to set the maximum average transmit power of the UE for transmission on the second air interface in the respective subsequent time interval comprises (i) computing by the UE a difference between a predefined limit of aggregate uplink transmit power of the UE and the determined actual average transmit power of the UE on the first air interface in the given time interval and (ii) setting by the UE, as the maximum average transmit power of the UE for transmission on the second air interface in the respective subsequent time interval, the computed difference, and
   (iii) applying by the UE the set maximum average transmit power as a limitation on uplink transmit power of the UE for the transmission on the second air interface in the respective subsequent time interval,
   wherein the first air interface is a frequency division duplex (FDD) air interface, and wherein the second air interface is a time division duplex (TDD) air interface.

2. The method of claim 1, wherein for each given time interval of the series of time intervals, the respective subsequent time interval immediately follows the given time interval.

3. The method of claim 1, wherein for each given time interval of the series of time intervals, the respective subsequent time interval is at least two time intervals after the given time interval.

4. The method of claim 1, further comprising:
   dividing by the UE the first air interface into a first continuum of equal-duration time intervals, and dividing by the UE the second air interface into a second continuum of equal-duration time intervals, wherein the time intervals of the first continuum are the same duration as the time intervals of the second continuum, wherein each given time interval is a time interval of the first continuum, and, for each given time interval, the respective subsequent time interval is a time interval of the second continuum.

5. The method of claim 4, wherein the time intervals of the first continuum are aligned with the time intervals of the second continuum.

6. The method of claim 1, wherein the UE is required to limit aggregate uplink transmit power of the UE to not exceed the predefined limit on average over a predefined time window, and wherein the time intervals are substantially shorter than the predefined time window.

7. The method of claim 6, wherein the predefined limit is 23 decibel-milliwatts (dBm).

8. The method of claim 6, wherein each time interval is no longer than half of the predefined time window.

9. The method of claim 1, wherein applying by the UE the set maximum average transmit power as a limitation on uplink transmit power of the UE for the transmission on the second air interface in the respective subsequent time interval comprises limiting by the UE an actual average transmit power of the UE on the second air interface in the respective subsequent time interval to be no higher than the maximum average transmit power.

10. A method for controlling uplink transmit power of a user equipment device (UE) when the UE is served concurrently on a frequency division duplex (FDD) air interface and a time division duplex (TDD) air interface, wherein the UE is required to limit its aggregate uplink transmit power across the FDD air interface and TDD air interface to not exceed a predefined limit on average over a predefined time window, the method comprising:

dividing by the UE the FDD air interface and TDD air interface respectively into a continuum of equal-duration time intervals, wherein each time interval is no longer than half of the predefined time window; and for each successive given time interval of the continuum of time intervals, (i) determining by the UE an actual average transmit power of the UE on the FDD air interface in the given time interval, (ii) using by the UE the determined actual average transmit power of the UE on the FDD air interface in the given time interval as a basis to set a maximum average transmit power of the UE on the TDD air interface in a respective subsequent time interval of the continuum of time intervals, and (iii) applying by the UE the set maximum average transmit power as a limitation on uplink transmit power of the UE on the TDD air interface in the respective subsequent time interval, wherein using the determined actual average transmit power of the UE on the FDD air interface in the given time interval as a basis to set the maximum average transmit power of the UE on the TDD air interface in the respective subsequent time interval comprises (i) computing by the UE a difference between the predefined limit and the determined actual average transmit power of the UE on the FDD air interface in the given time interval and (ii) setting by the UE, as the maximum average transmit power of the UE for transmission on the TDD air interface in the respective subsequent time interval, the computed difference.

11. A user equipment device (UE) comprising:

a wireless communication interface supporting air interface communication concurrently on a first air interface and a second air interface, wherein the wireless communication interface supports variable transmit power of the UE respectively on each air interface; and a controller configured to cause the UE to carry out operations iteratively for each given time interval of a series of time intervals when the UE is served concurrently on the first air interface and the second air interface:

determining an actual average transmit power of the UE on the first air interface over the given time interval, using the determined actual average transmit power of the UE on the first air interface over the given time interval as a basis to set a maximum average transmit power of the UE for transmission on the second air interface in a respective subsequent time interval, wherein using the determined actual average transmit power of the UE on the first air interface over the given time interval as the basis to set the maximum average transmit power of the UE for transmission on the second air interface in the respective subsequent time interval comprises (i) computing a difference between a predefined limit of aggregate uplink transmit power of the UE and the determined actual average transmit power of the UE on the first air interface in the given time interval and (ii) setting, as the maximum average transmit power of the UE for transmission on the second air interface in the respective subsequent time interval, the computed difference, and applying the set maximum average transmit power as a limitation on uplink transmit power of the UE for the transmission on the second air interface in the respective subsequent time interval, wherein the first air interface is a frequency division duplex (FDD) air interface, and wherein the second air interface is a time division duplex (TDD) air interface.

12. The UE of claim 11, wherein the UE is required to limit aggregate uplink transmit power of the UE to not exceed the predefined limit on average over a predefined time window, and wherein the time intervals of the continuum of time intervals are no longer than one half of the predefined time window.

13. The UE of claim 11, wherein applying the set maximum average transmit power as a limitation on uplink transmit power of the UE for the transmission on the second air interface in the respective subsequent time interval comprises limiting an actual average transmit power of the UE on the second air interface in the respective subsequent time interval to be no higher than the maximum average transmit power.

14. The UE of claim 11, wherein the controller comprises a processing unit and program instructions executable by the processing unit to cause the UE to carry out the operations.

* * * * *